Jan. 20, 1970  F. M. GLASS  3,491,253
CURRENT INTEGRATOR
Filed Nov. 18, 1966  3 Sheets-Sheet 1

INVENTOR.
Floyd M. Glass
BY
ATTORNEY.

Jan. 20, 1970  F. M. GLASS  3,491,253
CURRENT INTEGRATOR
Filed Nov. 18, 1966  3 Sheets-Sheet 2

INVENTOR.
Floyd M. Glass
BY
ATTORNEY.

INVENTOR.
Floyd M. Glass
ATTORNEY.

United States Patent Office 3,491,253
Patented Jan. 20, 1970

3,491,253
CURRENT INTEGRATOR
Floyd M. Glass, Oak Ridge, Tenn., assignor to the United States of America as represented by the United States Atomic Energy Commission
Filed Nov. 18, 1966, Ser. No. 595,539
Int. Cl. G06g 7/12
U.S. Cl. 307—229      4 Claims

ABSTRACT OF THE DISCLOSURE

A new all-solid state direct-current integrator integrates currents as low as $10^{-11}$ ampere with an accuracy of 1%. The voltage across a storage capacitor in the input circuit is monitored by an electrometer type operational amplifier, the output of which triggers a discriminator at a given voltage level. The discriminator generates a reset pulse which effects the removal of a fixed charge from the integrating capacitor by means of one of two current switches depending upon the polarity of the input signal. Complementary silicon planar transistors that operate in the inverted mode are utilized as the current switches. These transistors normally have both their base-emitter and base-collector junctions reverse biased and look like open switches with leakage currents of about $10^{-13}$ ampere. Reset pulses switch one of these transistors from the reverse-biased state to the active state for a precise time during which a constant current flows to or from the integrating capacitor. Therefore, each reset pulse removes from the integrating capacitor a precise charge that is the product of the current and the duration of the active state. By the employment of sufficient gain in the operational amplifier to maintain small voltage excursions at the input, the total effective leakage may be kept as low as $10^{-14}$ ampere. A scaler output provides an indication of the integrated charge, and a built-in duty-cycle meter calibrated in counts per second provides an indication of the instantaneous current.

---

The invention described herein was made in the course of, or under, a contract with the U.S. Atomic Energy Commission.

The present invention relates to an improved current integrator device and more partciularly to an instrument for accurately integrating currents as small as $10^{-11}$ ampere. In the electronic art there is an ever-increasing need for the measurement of very small currents. These currents may be derived, for example, from radiation and/or particle detectors used in high energy physics, etc. It is often desired to determine the total charge or integrated current and it has been common practice in the prior art to accumulate the charge on a capacitor and then remove it in discrete "bits" and count the number of bits as a measure of the total intgrated current.

In several prior art current integrators that employ diode pumps there is a disadvantage that is common to such integrators; that is, the leakage currents through various paths removed undesirable amounts of the charge on the capacitors utilized in the integrators such that the errors created thereby, particularly when integrating very small currents, affected the circuit accuracy to the extent that the best of such prior integrators could not accurately integrate currents below about $10^{-9}$ ampere. In several other prior art current integrators that employ relays to transfer charge, such integrators are limited in reset frequency by the relatively slow operation of such relays, thus limiting the range of a single-range instrument to less than three decades.

With a knowledge of the above problems with prior current integrators, it is the object of the present invention to provide an improved current integrator which can accurately integrate currents as small as $10^{-11}$ ampere and cover four decades in a single-range instrument.

This and other objects and advantages of the present invention will become apparent upon a consideration of the following detailed specification and the accompanying drawings, wherein.

The above object has been accomplished in the present invention by providing a novel charge-dumping transistor circuit. Both junctions (base-emitter and base-collector) of the transistor are normally slightly back biased so as to provide extremely low leakage currents during this inverted mode of operation. The transistor is pulsed into conduction by a conventional reset pulse (of appropriate size) simultaneously applied to both junctions. A reference voltage causes the base to be a few volts less than the collector when the transistor is pulsed into conduction and, in this manner, the transistor circuit becomes a precise current generator. This circuit provides all the advantage of both inverted and normal operation. Other novel features of the present invention will become apparent upon a consideration of the following detailed specifications.

Figure 1:
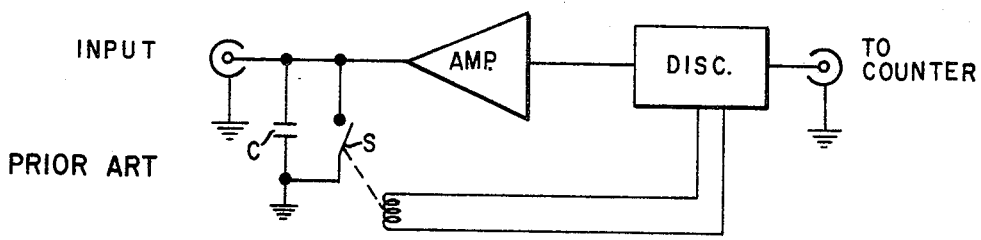
FIG. 1 illustrates one embodiment of a prior art current integrator circuit.
Figure 2:
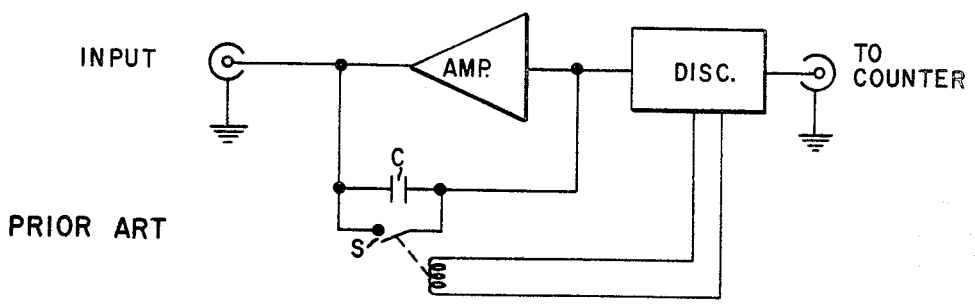
FIG. 2 illustrates another embodiment of a prior art current integrator circuit.
Figure 3:
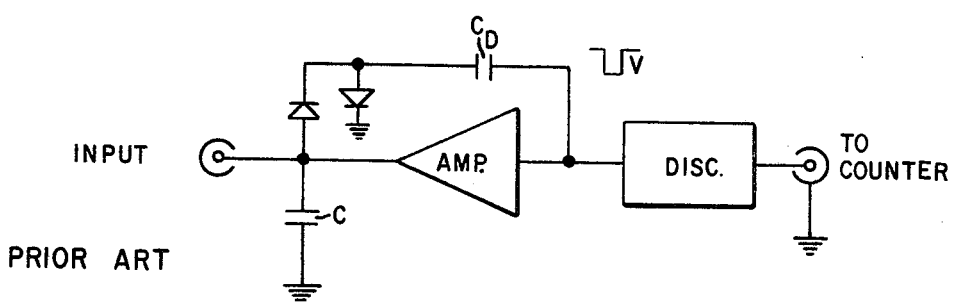
FIG. 3 illustrates still another embodiment of a prior art current integrator circuit.

Some of the various prior art instruments that have been used as current integrators are illustrated in FIGS. 1, 2, and 3. All of them employ a capacitor to be charged by the current, a means for removing all or a portion of the capacitor charge when it reaches a given voltage, and means for determining the number of times that the given charge is removed. This number can then be related to the integrated value of the original current.

FIG. 1 illustrates one of the earlier current integrators. The current to be measured causes a capacitor C to become gradually charged at the input of an amplifier. When this charge reaches a certain value, as set by the discriminator at the output of the amplifier, a signal from the discriminator causes a shorting of the integrating capacitor by a relay contact S, as shown. This signal for operation of the relay is also utilized for operating a counter to provide a "readout" proportional to the integrated current. There are several disadvantages to the system of FIG. 1. For example, any drift in the amplifier or discriminator changed the trigger point; thus a different amount of charge might be removed each time. Furthermore, the relative slow speed of the relay and variations in closure time gave rise to loss of charge, errors in quantity of charge being removed, and thus adversely affected the linearity of the instrument.

An improvement, at least in leakage current problems, was obtained with the prior art circuit of FIG. 2. By using the feedback, the input voltage remained near zero (instead of rising with the charge) and thus leakage by one leakage path was reduced, or at least remained constant. The disadvantages of the relay system and the possible drift in the amplifier or discriminator remained in the system of FIG. 2, however.

The prior art current integrator of FIG. 3 was the first known circuit which essentially eliminated the effects of drift in the amplifier or discriminator. A closely controlled amount of charge ($Q=C_DV$) was removed with each pulse of a given width and height. A switching circuit, not shown, was provided for negative or positive inputs. The circuit of FIG. 3 accurately integrated currents as low as $10^{-9}$ ampere. The major problem at low currents and particularly at currents lower than the above value is the error created by leakage at the input across the diodes of the "dump" network, the input stage of the amplifier, etc.

Figure 4:
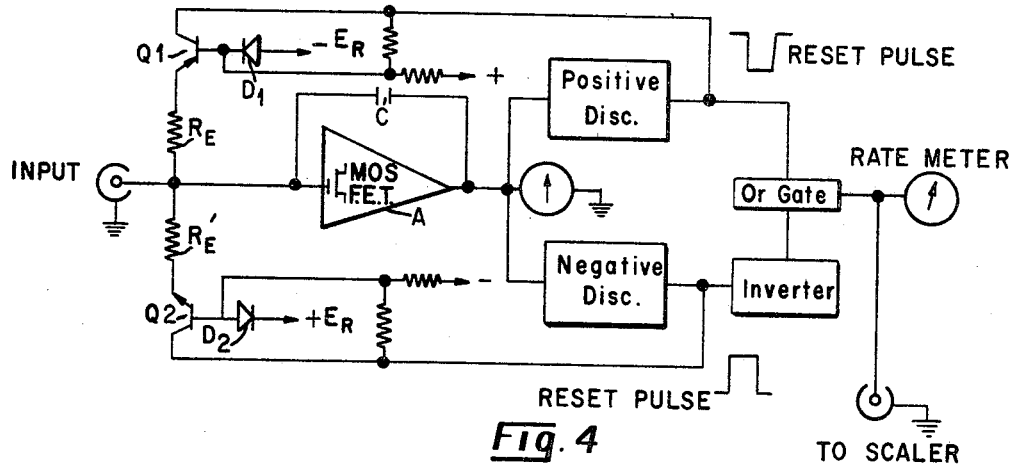
FIG. 4 is a simplified schematic diagram of one embodiment of a current integrator of the present invention.

The present invention provides for an improved current integrator wherein the leakage problem of FIG. 3 has been substantially improved such that currents as low as $10^{-11}$ ampere can now be accurately integrated. One embodiment of the present invention is illustrated in FIG. 4, wherein the current to be integrated is fed to a capacitor C which is in the feedback network for an operational amplifier A. The input stage of the amplifier is an insulated gate, i.e., a metal oxide silicon field effect transistor (MOSFET) and, therefore, leakage at the amplifier input is very low. Furthermore, since the voltage level at the input remains essentially constant, the leakage across the MOSFET does not vary. The output of the amplifier feeds into two conventional discriminators (to handle both negative and positive signals. Each of the discriminators actually consists of two trigger pairs. The function of the first pair, which is capable of free running when its D.C. threshold is exceeded, is to prevent "lock-out" and to provide a reasonably constant trigger pulse for the second pair. The function of the second trigger pair is to generate a reset pulse that is extremely constant in width. The output pulse, of given height and width, is utilized to cause removal of the back bias from the junctions of transistor $Q_1$ ($Q_2$) as to be described below. This output or reset pulse also is fed into a scaler and count rate meter for indicating the total amount of integrated current and the instantaneous current, respectively. In order to correct for the polarity of the signal, the output of the negative discriminator is fed through an inverter to an OR gate so that only a signal from the positive or the negative discriminator is recorded.

The output pulse, of given height and width, from the positive or negative discriminator is utilized in novel charge-dumping transistor circuits in the following manner. Both junctions (base-emitter and base-collector) of the silicon planar bipolar transistors $Q_1$ and $Q_2$ are normally slightly back biased so as to provide extremely low leakage currents during this inverted mode of operation. Under these conditions, the effective leakage contributed by the transistors $Q_1$ and $Q_2$ is the algebraic sum of the two emitter currents, and the effective leakage is less than $10^{-14}$ ampere. The transistor $Q_1$ or $Q_2$, each of which serves as a current switch, is pulsed into conduction by the above-mentioned discriminator output (reset) pulse which is simultaneously applied to both junctions. A reference voltage causes the base of the involved transistor $Q_1$ or $Q_2$ to be a few volts less than the collector when the transistor is pulsed into conduction and, in this manner, the transistor circuit becomes a precise current generator. As such, it removes precise quantities of charge from the integrating capacitor C, the amount removed being given by the approximate expression:

$$Q = \tau\left(\frac{E_R + E_D - E_B}{R_E}\right)$$

where $\tau$ is the pulse width, $E_R$ ($-E_R$) is a fixed reference voltage which normally back biases the base of the transistor $Q_2$ ($Q_1$), $E_D$ is the forward drop across diode $D_2$ ($D_1$), $E_B$ is the forward bias of the emitter-base junction of the transistor $Q_2$ ($Q_1$), and $R_E'$ ($R_E$) is the resistor between the transistor and the integrator input. The quantity represented in the brackets of the above equation is the current that flows for the duration of the reset pulse. Since $E_B$ and $E_D$ have opposite signs, almost perfect temperature compensation can be achieved by matching the diode current of the clamp with the emitter current of the switching transistor. Since the base driving impedance is the low dynamic impedance of the diode and the input always remains at essentially ground potential, the switching transistors and $R_E$ provide a current source that has essentially the same stability as $R_E$. Since the above parameters can be closely controlled, the number of reset pulses will accurately be a measure of the integrated current.

The use of the low-leakage ($10^{-13}$ ampere) silicon planar bipolar transistors $Q_1$, $Q_2$ as current switches and the use of the insulated gate field effect transistor in the input to the amplifier network of FIG. 4 provides for the accurate measurement of currents as small as $10^{-11}$ ampere, which is two orders of magnitude better than any known prior art integrator when operating at the pulse rate of the present device of FIG. 4 or FIG. 5, to be described below.

Figure 5:
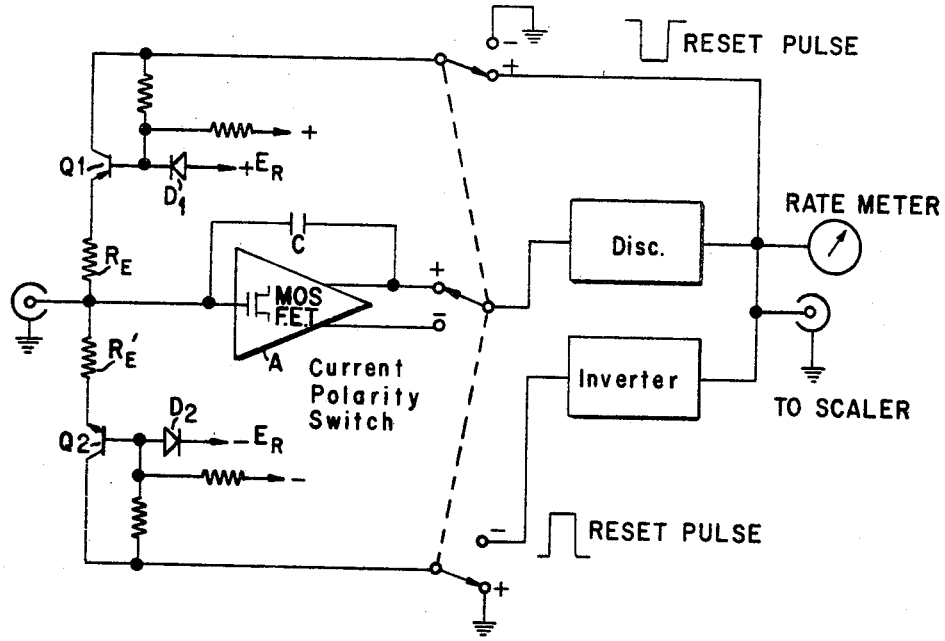
FIG. 5 is a simplified schematic diagram of a preferred embodiment of the present invention.

A simplified, more reliable, and preferred embodiment of the present invention is shown in FIG. 5. By using a current polarity switch, a single discriminator may be utilized and thereby eliminate any problems of matching the performance of two discriminators. The system of removing charge from the integrating capacitor is the same for both the embodiments of FIG. 4 and FIG. 5.

Figure 6:
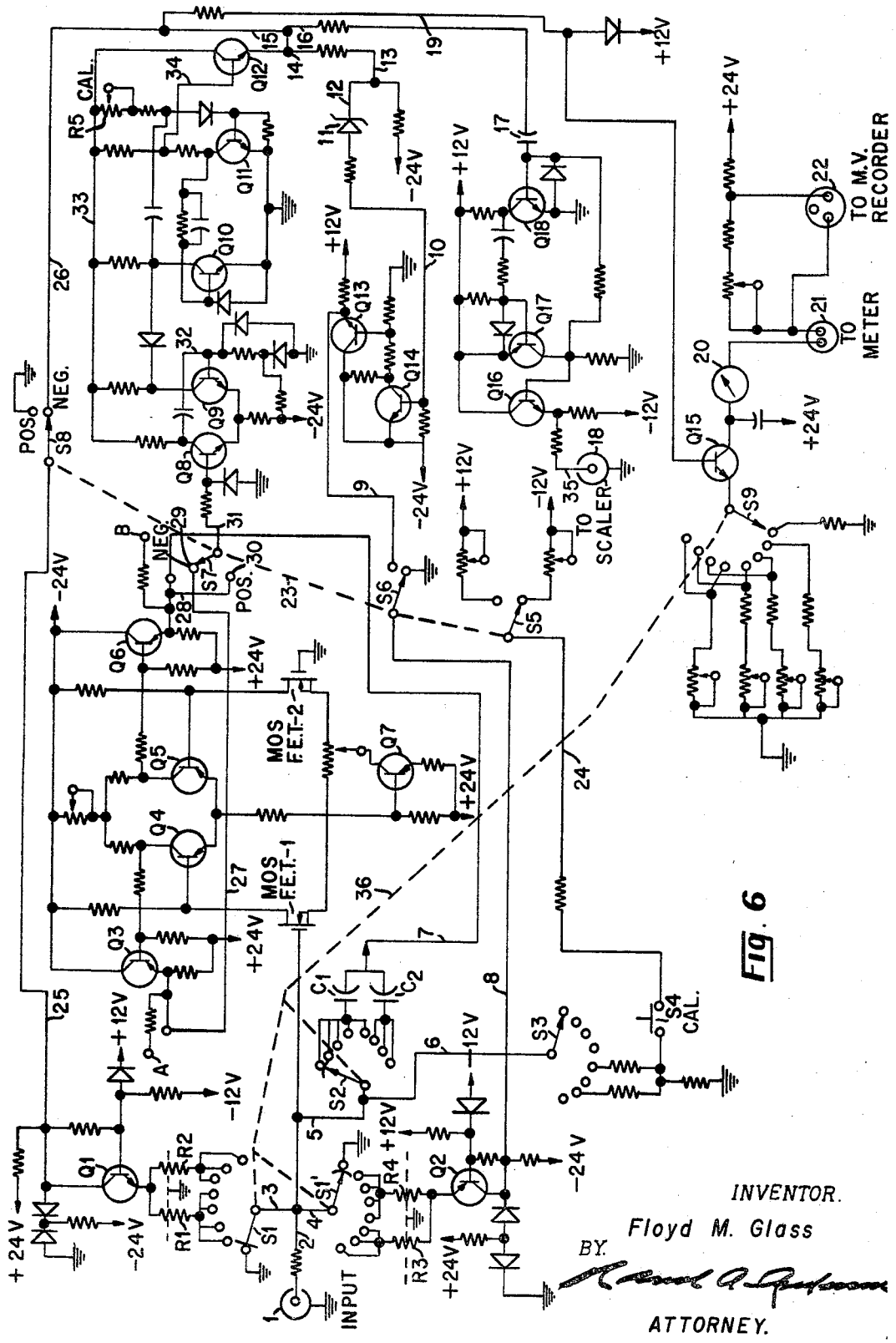
FIG. 6 is a complete schematic circuit diagram of the integrator of FIG. 5.

A more detailed circuit diagram of the embodiment of FIG. 5 is shown in FIG. 6. The conventional operational amplifier includes two insulated gate field effect transistors, MOSFET–1 and MOSFET–2, and transistors $Q_3$ and $Q_7$. The conventional discriminator comprises a multivibrator including a first trigger pair of transistors $Q_8$ and $Q_9$, a second trigger pair of transistors $Q_{10}$, $Q_{11}$ for accurate pulse shaping, and an output stage including transistor $Q_{12}$. The inverter includes transistors $Q_{13}$ and $Q_{14}$; the count rate meter circuit includes a transistor $Q_{15}$; and the scaler driver includes transistors $Q_{16}$ through $Q_{18}$.

The current polarity switching means includes switches S5, S6, S7, and S8 which are ganged together by a mechanical coupling 23. A switch S1 permits the choice of one of two resistors R1 or R2 and the switch S1' permits the choice of one of two resistors R3 or R4, depending upon the range of current being integrated. A switching of the resistors also causes a simultaneous switching by a switch S2 to the proper integrating capacitor C1 or C2. Appropriate switching also takes place in the rate meter circuit by means of a switch S9. Switches S1, S1', S2, and S9 are mechanically ganged together by means of a coupling 36. Having selected the proper values of R and C, final calibration is made by adjustment of pulse width in the discriminator by means of an adjustable resistor R5. It should be understood that the system of FIG. 6 is not limited to the use of the above switching means for selecting the desired resistor and capacitor and for the rate meter circuit. For example, a plurality of reed relays may be used to provide the desired selection of the above components, if desired, and, in some applications, the use of such relays may be preferred.

The input to the circuit of FIG. 6 is by means of a connector 1, which is connected by means of a lead 2 and a lead 3 to the switch S1 and by lead 2 and a lead 4 to switch S1'. Lead 2 is also connected to the transistor MOSFET–1 of the amplifier network. Capacitor C1 or C2 is connected in a feedback circuit across the amplifier network by means of a lead 7 and by means of the switch S2 and lead 5 which is connected to the input lead 2 to the amplifier network. A negative output signal from the amplifier network is connected by a lead 27 from the transistor $Q_3$ to an output terminal 29, or a positive output signal therefrom is connected by a lead 28 from the transistor $Q_6$ to an output terminal 30. The current polarity switch S7 is connected either to the terminal 29 or to the terminal 30, depending upon whether a positive or a negative signal is being monitored from the input connector 1.

The switch S7 is connected by means of a lead 31 to the input transistor $Q_8$ of the discriminator network. The transistor $Q_8$ is coupled to the transistor $Q_9$ by means of a lead 32. The collectors of the transistors $Q_8$ through $Q_{12}$ are connected together by means of a lead 33 and appropriate resistors in a conventional manner. The transistor $Q_{11}$ of the pulse shaping portion of the discriminator is coupled by a lead 34 to the output transistor $Q_{12}$. The output of the transistor $Q_{12}$ is connected to a junction point 14 which is connected in one of two charge-dumping circuits, depending on the position of the switches S6 and S8. For the position of these switches as shown in FIG. 6, the charge-dumping circuit for the transistor $Q_1$ is from junction point 14, lead 15, lead 26, switch S8, and lead 25 to the transistor $Q_1$. For the other position of the switches S6 and S8, the charge-dumping circuit for the transistor $Q_2$ is from junction point 14, leads 13 and 12, diode 11, lead 10, through the inverter network including transistors $Q_{13}$ and $Q_{14}$, lead 9, switch S6, and lead 8 to the transistor $Q_2$. Both junctions (base-emitter and base-collector) of the transistors $Q_1$, $Q_2$ are normally slightly back biased so that their leakage is very low—of the order of $10^{-13}$ ampere and a combined effective leakage of less than $10^{-14}$ ampere. If necessary, the leakage currents of $Q_1$ and $Q_2$ can be made identical by adjusting the bias on the base of either $Q_1$ or $Q_2$ by means, not shown. Typically, the reset pulse over lead 25 or lead 8 has an amplitude of 20 volts and a width of 100 $\mu$sec. When these transistors are turned on, they become precise current generators to remove precise amounts of charge from the integrating capacitor C1 or C2. The amount of charge removed per pulse is either $10^{-7}$ coulomb or $10^{-10}$ coulomb, depending upon the values of $V/R$ and $\tau$, the width of the reset pulse or conduction time.

The output of transistor $Q_3$ of the amplifier network is also connected to a terminal point "A," and the output of the transistor $Q_6$ of the amplifier network is also connected to a terminal point "B." These terminal points A and B may be alternately connected into a conventional vacuum tube voltmeter, not shown, for measuring the respective outputs of the amplifier network.

The output of transistor $Q_{12}$ is also connected to a scaler through junction point 14, lead 16, condenser 17, a scaler driver circuit including transistors $Q_{18}$, $Q_{17}$, and $Q_{16}$, and a lead 35 to a connector 18 which is coupled to a conventional scaler, not shown. Junction point 14 is also connected by means of lead 15 and lead 19 to a transistor $Q_{15}$. The transistor $Q_{15}$ is biased by means of the switch S9 and the resistor network, as shown. The output of transistor $Q_{15}$ is connected to a meter 20, to a connector 21 leading to an external meter, not shown, and to a connector 22 leading to a millivolt recorder, not shown.

The switch S5 is utilized to connect either a +12 volt source or a —12 volt source in a calibration circuit including a lead 24, a switch S4, an appropriate resistor, a switch S3, a lead 6, and lead 5 to the input lead 2 to the amplifier network.

The system of FIG. 4 or FIG. 6 can accurately integrate currents as small as $10^{-11}$ ampere by the use of the improved charge-dumping circuits as described above.

This invention has been described by way of illustration rather than by way of limitation, and it should be apparent that it is equally applicable in fields other than those described.

What is claimed is:

1. In a current integrator for integrating an input current including an operational amplifier connected to said input current, a charge storage capacitor connected in a feedback circuit across said amplifier, a discriminator network connected to the output of said amplifier, and a scaler and count rate meter connected to the output of said discriminator network, the improvement comprising a charge-dumping transistor circuit connected between the output of said discriminator network and the input to said amplifier, said transistor circuit including a low-leakage silicon planar transistor means connected to the base and collector junctions of said transistor for normally reverse biasing these junctions slightly, and a resistor connected between the emitter junction of said transistor and said amplifier input, the output of said discriminator network being connected to the base and collector junctions of said transistor, and a reference voltage connected to the base junction of said transistor, whereby each output pulse of a given height and width from said discriminator network provides a reset pulse to said transistor circuit to remove said reverse biasing from the junctions of said transistor thereby effecting removal of a precise amount of charge from said charge storage capacitor for each such discriminator output pulse, whereby said integrator is adapted to integrate currents as low as $10^{-11}$ ampere.

2. The current integrator set forth in claim 1, wherein said improvement further comprises a second, charge-dumping transistor circuit identical to said first transistor circuit and further including an inverter connected between the discriminator output and the transistor of said second charge-dumping circuit, a manually operable current polarity switching means connected between said amplifier and said discriminator and alternately connecting said respective charge-dumping circuits to said discriminator output such that for a negative input signal to said amplifier said first transistor circuit is connected to the discriminator output and that for a positive input signal to said amplifier said second transistor circuit is connected to the discriminator output, whereby said integrator can integrate either positive or negative input signals.

3. The current integrator set forth in claim 2, wherein there is further included a second resistor connected to the output of the transistor of said first charge-dumping circuit, a first selector switch for connecting one or the other of said resistors of said first circuit to the input of said amplifier, another resistor connected to the output of the transistor of said second charge-dumping circuit, a second selector switch for connecting one or the other of said resistors of said second circuit to the input of said amplifier, said feedback circuit across said amplifier further including a second capacitor and a third selector switch for connecting one or the other of said capacitors in said feedback circuit, said first, second, and third selector switches being mechanically ganged together.

4. The current integrator set forth in claim 3, wherein an insulated gate "field effect transistor" is connected at the input to said amplifier to minimize any current leakage thereacross.

References Cited

UNITED STATES PATENTS

| | | | |
|---|---|---|---|
| 2,974,291 | 3/1961 | Colletti | 328—210 |
| 3,319,078 | 5/1967 | Dunnet | 307—214 |
| 3,322,942 | 5/1967 | Gerard | 235—183 |
| 3,350,574 | 9/1967 | James | 307—229 |

JOHN S. HEYMAN, Primary Examiner

D. M. CARTER, Assistant Examiner

U.S. Cl. X.R.

307—238, 242